Patented May 13, 1952

2,596,737

UNITED STATES PATENT OFFICE 2,596,737

STYRENATED PRODUCTS

Roy W. H. Tess, Orinda, Robert H. Jakob, San Francisco, and Theodore F. Bradley, Orinda, Calif., assignors to Shell Development Company, Emeryville, Calif., a corporation of Delaware No Drawing. Application October 13, 1950, Serial No. 190,064

8 Claims. (Cl. 260—23)

This invention relates to interpolymers of monoarylalkenes such as styrene with olefinically-unsaturated higher fatty acid polyesters of glyceryl polyethers of dihydric phenols, which interpolymers have been discovered to possess unusually superior protective properties after drying as films. More particularly, the invention pertains to styrenated products of drying oil acid polyesters of a special class of esterifiable aromatic polyethers.

Natural drying oils are notably lacking in the rapid rate of drying needed in modern industrial uses. They also give dried films which are lacking in suitable hardness and durability. With the object of overcoming such faults, it has been proposed heretofore to interpolymerize styrene with natural oils (glycerides such as linseed or soybean oil) so as to obtain products more suitable for use as protective films. Although styrenation somewhat improves the drying times and hardness, the dried films of such products have poor alkali resistance. Satisfactory alkali resistance for surface-coating films is of utmost importance because it is customary to subject many protective coatings to repeated contact with washing and cleansing solutions such as soapy water which is of basic character and often contains considerable amounts of free alkali.

In efforts to further improve the rapidity of drying as well as the hardness and durability of the resulting films, later workers in the art interpolymerized styrene with drying oil acid-modified glycerine alkyds and obtained products which have shorter drying times and give dried films with better hardness. However, the gain in drying speed and hardness of these styrenated alkyds is achieved without improvement of the afore-mentioned important property of alkali resistance. Styrenation of alkyd resins and oils also tends to impart brittleness and poor scratch resistance and reduces durability to the weather. Consequently, the utility of these two types of styrenated products is restricted to limited fields of application.

We have now discovered a method for preparing an unexpectedly superior product by interpolymerizing styrene and/or a related monoarylalkene with an olefinically unsaturated higher fatty acid polyester of glyceryl polyethers of dihydric phenols. Our new interpolymers not only dry at a very rapid rate and give films of excellent hardness, but also, the resulting dried films have alkali resistance so vastly superior to that of films from the styrenated drying oils (glycerides) that the properties of the two are not comparable. The drying rate of our new products is also much faster than that of the styrenated alkyds while at the same time attainment of this favorable property has been achieved without sacrifice in the property of alkali resistance. The alkali resistance of films from our interpolymers is likewise remarkably superior to that of films from the styrenated alkyds. Moreover, we have discovered that our products dry hard at quite rapid rates even though no drier, e. g., cobalt salts, have been incorporated therewith. It was also found that films of our interpolymer dried in the absence of driers had better alkali resistance than films from interpolymer containing drier. Films from styrenated alkyds containing no drier require very long times to dry hard as well as having poor alkali resistance.

The esters employed as a component in our interpolymers are olefinically unsaturated higher fatty acid polyesters of esterfiable glyceryl polyethers of dihydric phenols. The esterifiable polyethers are obtained by reacting a dihydric phenol in alkaline solution with epichlorhydrin. These polyethers have a chemical structure wherein the glyceryl radicals from the epichlorhydrin, and the divalent aromatic hydrocarbon radicals from the dihydric phenol are present as a chain with the two types of radicals alternating and being joined into the chain by ethereal oxygen atoms. The terminal groups of the chain in the polyethers may contain 1,2-epoxy groups due to the presence of a glycidyl radical thereat although some of the terminal groups may be dihydroxylglyceryl radicals from hydration of the glycidyl radical.

The simplest of the polyethers are diglycidyl diethers of dihydric phenols which contain a single divalent aromatic hydrocarbon radical from the dihydric phenol and have two glycidyl radicals linked thereto by ethereal oxygen atoms. More generally, the polyether is of resinous character and contains two or more aromatic hydrocarbon radicals alternating with glyceryl groups which are connected therewith through ether oxygen atoms. Ordinarily, the polyether is a complex mixture of compounds rather than being a single particular compound. The principal product may be represented by the formula

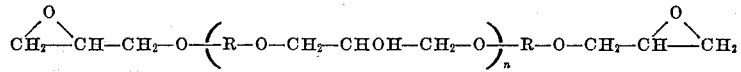

wherein $n$ is an integer of the series $0, 1, 2, 3 \ldots$, and R represents the divalent hydrocarbon radical of the dihydric phenol. While for any single molecule, $n$ will be an integer, the fact that the polyether is a mixture of compounds causes the determined value for $n$, e. g., from molecular weight measurement, to be an average which is not necessarily zero or a whole number. Although the polyether is a substance primarily of the above formula, it may contain some material with one or both of the terminal glycidyl radicals in hydrated form.

The esterifiable groups contained in the polyethers are attached to the glyceryl radicals

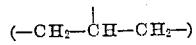

therein. These esterifiable groups are epoxy groups and alcoholic hydroxyl groups, both of which are attached to the glyceryl radicals. Upon reaction of the polyethers with the unsaturated fatty acids, both of these esterifiable groups form ester linkages to the glyceryl radicals by joinder thereto of acyloxy groups. While $n$ is ordinarily a value from 0 to 10 in the polyethers, it is generally preferred to employ esters from polyethers wherein $n$ is 3 to 6.

Any of the various dihydric phenols is used in preparing the esterifiable polyethers including mononuclear phenols such as resorcinol, catechol, hydroquinone, methyl resorcinol, etc.; or polynuclear phenols like 2,2-bis(4-hydroxyphenyl)propane (bis-phenol), 4,4'-dihydroxybenzophenone, bis(4 - hydroxyphenyl)methane, 1,1 - bis(4-hydroxyphenyl)ethane, 1,1-bis(4-hydroxyphenyl)isobutane, 2,2 - bis(4 - hydroxyphenyl)butane, 2,2 - bis(4 - hydroxy-2-methylphenyl)propane, 2,2-bis(4 - hydroxy-2-tertiarybutylphenyl)propane, 2,2 - bis(2-hydroxynaphthyl)pentane, 1,5-dihydroxynaphthalene, etc.

The esterifiable polyethers are prepared, in general, by heating at about 50° C. to 200° C. the dihydric phenol with epichlorhydrin in a basic reaction medium. Depending upon the type of product desired, there is used from more than 1 to 2 or more mols of epichlorhydrin per mol of dihydric phenol. Also present is a base such as sodium, potassium, calcium or barium hydroxide, generally in amount of about 5% to 30% stoichiometric excess of the epichlorhydrin, i. e., 1.05 to 1.3 equivalents of base per mol of epichlorhydrin. In effecting the reaction, the dihydric phenol is mixed with an aqueous solution of the base and heated. The epichlorhydrin is then added rapidly to the stirred reaction mass. The initial reaction is somewhat exothermic so that a temperature rise occurs to some extent. After addition of the epichlorhydrin, heating is applied for several hours while stirring in order to complete the reaction. While still in molten state, the formed polyether is washed with water until free of base.

The employed mol ratio of epichlorhydrin to dihydric phenol controls the molecular weight of the resulting polyether. By use of a substantial excess such as 3 to 10 mols of epichlorhydrin per mol of dihydric phenol, there is obtained as predominant product, the simple diglycidyl diether of the dihydric phenol ($n$ equals or approaches zero). This polyether is best prepared by mixing the epichlorhydrin and dihydric phenol, heating and then adding about two equivalents of the base per mol of dihydric phenol at such a rate that the reaction mixture is about neutral during the whole time of the reaction. The length of the chain of the polyether (value of $n$) is increased by decreasing the mols of epichlorhydrin to dihydric phenol. Thus by decreasing the mols of epichlorhydrin per mol of dihydric phenol from about two downwards toward one, the molecular weight, the softening point and the number of esterifiable groups are increased.

The nature of the glyceryl polyethers from the dihydric phenols can be better understood by considering preparation of a particular product which we prefer to use in our invention. For convenience, this product will hereinafter be designated as Polyether A.

*Polyether A*

Into a reaction vessel fitted with a stirrer, 4 mols of 2,2-bis(4-hydroxyphenyl)propane (bis-phenol) and 6.43 mols of sodium hydroxide as a 10% aqueous solution are introduced and heated to about 45° C. whereupon 5 mols of epichlorhydrin are added rapidly while agitating the mixture. The temperature is then adjusted so that the mixture is heated at about 100° C. to 105° C. for about 80 minutes. The mixture separates into a two-phase system and the aqueous layer is decanted. The resulting polyether is then washed with boiling water until neutral to litmus whereupon the resulting product is drained and dehydrated by heating at about 150° C.

The polyether has a softening point of about 100° C. (Durrans' Mercury Method). The molecular weight is 1400 measured ebullioscopically in ethylene dichloride so average $n=3.7$. The esterification value is 0.557 equivalent per 100 grams. The esterification value is obtained by heating a sample of the polyether with about twice the theoretical amount of higher fatty acid necessary to react with all of the hydroxyl and epoxy groups, the higher fatty acid being Armour's Neofat No. 3 consisting of about 50% linoleic acid, 40% oleic acid, and 10% stearic acid. The heating is effected at about 230° C. until a constant acid value is obtained. This may require 10 hours heating. By back titrating the unreacted fatty acid with base, a measure is obtained from which the esterification value may be calculated. The polyether also had an epoxy value of 0.103 equivalent per 100 grams and a hydroxyl value of 0.328 equivalent per 100 grams.

In like manner, other polyethers of bis-phenol or of other dihydric phenols may be prepared which will have different molecular weights and values for $n$ depending upon the molar ratio of epichlorhydrin to dihydric phenol used in preparation thereof. This fact is illustrated with various glyceryl polyethers of bis-phenol made with variation in molar ratio as shown in the following table.

| Polyether | Mol Ratio Epichlorhydrin to bis-Phenol | Mol Ratio NaOH to Epichlorhydrin | Softening Point, °C. | Mol Wt. | $n$ | Esterification Value, eq. per 100 g. |
|---|---|---|---|---|---|---|
| B | 2.6 | 1.1 | 27 | 469 | 0.5 | 0.915 |
|   | 2.04 | 1.05 | 42 | 710 | 1.3 | 0.961 |
|   | 1.57 | 1.2 | 71 | 900 | 2.0 | 0.747 |
| A | 1.25 | 1.1 | 100 | 1,400 | 3.7 | 0.557 |
| C |   |   | 130 | 2,900 | 9.0 | 0.532 |

Polyethers of still higher molecular weight are best obtainable by reacting a polyether of lower molecular weight with a small quantity of dihydric phenol. For example, a resinous polyether having a softening point of about 130° C., a molecular weight of 2900 and an esterification value of 0.532 equivalent per 100 grams is obtained by reacting Polyether A with an added 5% of bis-phenol. This reaction is effected by heating the polyether to 150° C., and then adding the bis-phenol. The heating is continued for about two hours while stirring the reaction mass and gradually increasing the temperature to about 200° C. This product, designated as Polyether C, is listed in the above table.

The interpolymers of the invention contain esters of the polyethers and olefinically unsaturated fatty acid, which acid contains 12 to 22 carbon atoms and has an iodine value of 110 to 400. Although the acid is ordinarily derived from a natural oil, acids of proper chain length and iodine value from other sources are likewise suitable. It is preferred that the only unsaturation in the fatty acid be from presence therein of one or more olefinic double bonds, but the esters from acids also containing acetylenic triple-bond unsaturation are likewise applicable.

Various natural oils classified as drying or semi-drying oils are suitable sources of the unsaturated fatty acids for the esters. Ordinarily the acid from the natural oil is a mixture of different fatty acids, some saturated and some unsaturated to greater or lesser degree. The presence of saturated acids is not objectionable so long as the acid as a whole has an iodine value of at least 110. The esters thus contain acyl groups from one or more representative unsaturated acids such as hiragonic, linoleic, linolenic, elaeostearic, licanic, arachidonic, and clupanodonic. It is preferred that the acid contain one or more polyene, e. g., di- to penta-ene fatty acids. Substantial quantities of one or more of these acids occur (in the form of glycerides) in many natural oils including linseed, soybean, corn, cottonseed, hemp seed, kapok seed, herring, perilla, poppy seed, pilchard, whale menhaden mustard, peanut, rapeseed, salmon, sardine, walnut, dehydrated castor, rubber seed, safflower, sesame, tung and oiticica oils, all of which yield fatty acid suitable for use in the esters of the polyethers. Thus, although there is some variation due to geographical and climatic differences, linseed oil contains about 45% linolenic acid, about 25% linoleic acid, and about 20% oleic; soybean oil contains about 50% linoleic acid; tung oil contains about 80% elaeostearic acid; cotton seed oil contains about 40% linoleic acid; hempseed oil contains about 50% linoleic acid and about 25% linolenic acid; and oiticica oil contains about 10% linolenic acid and about 75% licanic acid. As previously noted, the presence in the acid of saturated acids such as lauric, myristic, palmitic, stearic and behenic is not objectionable as is also true of mono-olefinic acids such as lauroleic, myristoleic, palmitoleic, oleic, gadoleic and erucic, provided the iodine value of the acid as a whole is at least 110.

It is most preferred that the esters of the polyethers employed in the invention contain the acyl groups from linseed oil fatty acid. Such linseed oil fatty acid is well known in the art and may be obtained, as is also the case with fatty acid of other natural oils mentioned above, by hydrolyzing the oil, or by subjecting the oil to saponification with a base and thereafter acidifying the saponification product to obtain the free acid. Other preferred esters of the polyethers contain acyl radicals of soybean oil fatty acid, safflower oil fatty acid, and dehydrated castor oil fatty acid. In some cases, it is desirable to employ esters from mixtures of two or more natural oil fatty acids, such as soybean oil fatty acid, in admixture with linseed oil, tung oil or dehydrated castor oil fatty acid containing about 5% to 75% or more of the latter in the mixture.

The esters of the polyethers are prepared by heating and esterifying the polyether with the unsaturated fatty acid. The esterification is effected at temperatures of from about 125° C. to 275° C. in the presence or absence of an esterification catalyst such as sulfuric acid, toluene sulfonic acid, or the like. Preferably the esterification is conducted in an inert atmosphere such as by sparging with carbon dioxide. Since water is a product of the reaction, it is desirable to have present an inert azeotroping agent capable of removing the formed water by distillation. Xylene is an excellent material for this purpose, although other suitable agents include benzene, toluene and aromatic petroleum distillates. In preparing the ester, the heating and esterification is continued until the acid number of the product (solids basis) is reduced to less than 30, and preferably to less than 20. In order that the acid number of the polyester may be reducible to the indicated value, the initial proportions of the polyether and fatty acid are so chosen that up to about an equivalent amount of fatty acid is reacted with the esterifiable polyether, i. e., such proportion that there is up to about one carboxylic acid group of the fatty acid for each esterifiable group in the polyether whether that esterifiable group be an alcoholic group and/or an epoxy group. The polyesters for use in the invention contain at least three acyloxy groups from the fatty acid joined to glyceryl radicals of the polyether. Preferably they contain six to ten groups.

While not to be construed as limiting, the following describe in some detail preparation of some polyesters used in the invention. For convenience, these will be designated Polyester A and Polyester B.

*Polyester A*

In a glass reaction vessel fitted with a phase separating condenser, stirrer and carbon dioxide bubbler, a mixture of 1200 parts of Polyether A and 1875 parts of linseed fatty acid (95% of theory) was upheated to 230° C. in 1¾ hours and held at that temperature for an additional 6 hours. The mixture was allowed to cool and reheated at later time to 230° C. in 1½ hours after addition thereto as azeotroping agent of a petroleum solvent having a boiling range of about 315° F. to 380° F., an A. P. I. gravity of about 34.1, and containing about 65% aromatics. The heating was continued at 230° C. for 6 hours during which time the acid number was reduced to 17.9. The product was cooled, diluted to 50% solids with addition of the petroleum solvent, and filtered to remove a very small amount of insoluble material.

*Polyester B*

In a glass apparatus equipped with phase separating condenser, stirrer, xylene azeotroping agent and nitrogen bubbler, a mixture of 900 parts by weight of Polyether A and 1100 parts by weight of linseed oil fatty acid having an iodine value of 184 was heated to 250° C. in 135 minutes and held at 250° C. for 4 hours and 35 minutes. The product after dilution with xylene to a non-volatile or polyester content of 50%, and filtration through Super-cel, had an acid number of 3.7 mg. KOH per g. on solids and a Gardner-Holdt viscosity of H.

The interpolymer of the invention is prepared by interpolymerizing the polyester with a monoaryl-2-alkene-1. The monoaryl-2-alkene-1 contains up to 4 carbon atoms in the alkene group and up to 12 carbon atoms in the aryl group. Preferably, the polymerizable monoaryl-2-alkene-1 is free of other elements than carbon, hydrogen and halogen. Among representative compounds suitable for use in the invention are phenylethene (styrene), phenyl-2-propene (alpha-methyl styrene), phenyl-2-butene-1, ortho-methylphenylethene, para-methylphenylethene, ortho-ethylphenylethene, para-ethylphenylethene, ortho,para-dimethylphenylethene, meta-isopropylphenylethene, naphthylethene, diphenylethene, dimethylnaphthylethene, para-chlorophenylethene, meta-chlorophenylethene, ortho,-para-dichlorophenylethene, ortho-methyl-chlorophenylethene, ortho-methylphenyl-2-propene, para-isobutylphenyl-2-butene-1, ortho-chlorophenyl-2-propene, ortho-chloro-meta-ethylphenyl-2-butene-1, ortho,para-dichlorophenyl-2-propene, naphthyl-2-propene, ethylnaphthyl-2-butene-1, ortho-fluorophenylethene, para-bromo-phenyl-2-propene, ortho,para-diisodophenyl-2-propene, ortho-chloro-para-bromophenylethene, and the like. It is preferred to employ an arylethene owing to its ease of interpolymerization. Because of availability and cheapness, styrene is particularly preferred. However, good results are also obtained with the other arylalkenes of the class. In some cases, it is desirable to employ mixtures of different arylalkenes, such as styrene, in admixture with about 5% to 50% of alpha-methyl styrene, for the purpose of control of the rate of interpolymerization with the polyester or for other purposes.

The interpolymers of the invention contain about 10% to 75% by weight of arylalkene in polymerized form, the remaining percentage being the polyester. Thus, 100 parts of the interpolymers contain from about 10 parts of the arylalkene and 75 parts of the polyester to about 75 parts of the arylalkene and 25 parts of the polyester, all parts being by weight. Although the interpolymers containing components within the stated proportions have the useful and desirable combination of properties described hereinbefore, it is preferred that the interpolymers contain about 25% to 60% of the arylalkene. Particularly preferred interpolymers contain about one-third by weight of chemically combined arylalkene.

The interpolymers of the invention are prepared by heating the arylalkene and the olefinically unsaturated fatty acid polyester of the glyceryl polyether of the dihydric alcohol at a temperature of from about 100° C. to 250° C. in an inert atmosphere. It is ordinarily desirable, though not essential, to effect the interpolymerization in the presence of a peroxide polymerization catalyst. For this purpose, about 0.1 to 5% of peroxide polymerization catalyst based on the weight of reactants is employed, the catalyst being any peroxide such as benzoyl peroxide, acetyl benzoyl peroxide, tertiary butyl perbenzoate, cumene hydroperoxide, tertiary butyl hydroperoxide, di-tertiary butyl peroxide, 2,2-bis-(tertiary butylperoxy) butene, or the like. The use of mixtures of peroxides is suitable, e. g., di-tertiary butyl peroxide, in admixture with tertiary butyl hydroperoxide. In general, peroxides containing a tertiary alkyl group, such as a tertiary butyl group, are preferred for use in preparing the interpolymers, since these compounds retain activity at the elevated temperatures employed in the interpolymerization and are thus efficient for the purpose intended. However, the use of other catalysts, including boron fluoride and Friedel-Crafts catalysts, is not precluded.

The interpolymerization is effected with the reacting materials in liquid phase, i. e., with at least part of the components of the mixture in liquid phase. Since the interpolymerization with peroxide catalysts is conducted by heating at an elevated temperature, such as from about 100° C. to 250° C., it may be necessary to employ superatmospheric pressure in order to have the reactants in liquid phase at least to partial extent. The use of a temperature from about 125° C. to 175° C. is preferred. It is convenient to effect the interpolymerization under reflux conditions in order to realize good control of the temperature. In this manner, the choice of temperature is controlled by the lowest boiling component in reaction mixture which may be the arylalkene, such as styrene, which boils at about 145° C., or an inert solvent component in the mixture such as an aromatic hydrocarbon. The interpolymerization may be effected with use of either the presence or absence of such an inert solvent for the arylalkene and polyester. Among suitable aromatic solvents are benzene, toluene, xylene and aromatic petroleum fractions or products.

The proportion of the two materials in effecting the interpolymerization is chosen so that it is the same as desired for the proportion in the product, i. e., from about 10% to 75% of arylalkene. Instead of mixing the whole of the arylalkene with the polyester and then bringing the mixture up to the desired reaction temperature at which the mixture is held while effecting the interpolymerization, it is ordinarily preferred to first preheat the polyester to reaction temperature and then add the arylalkene during a period of time while the interpolymerization is occurring. The heating is then continued for several hours to complete the polymerization reaction.

In order to keep the reactants and formed interpolymer out of contact with oxygen in the air, the reaction mixture is blanketed or sparged with an inert atmosphere. For this purpose, any inert gas is suitable such as carbon dioxide, nitrogen, methane, or natural gas.

The following examples are given to illustrate, but not to limit, the invention. For convenience in subsequent discussion of properties, the products will be designated as Interpolymer A and Interpolymer B.

Interpolymer A

Interpolymer A, containing about 50% of polymerized styrene, was prepared in a glass reactor equipped with a stirrer and carbon dioxide bubbler. In parts by weight, a solution of 200 parts of Polyester A in the aromatic mineral spirits boiling as described previously, 100 parts of freshly distilled monomeric styrene and 4 parts of di-tertiary butyl peroxide were heated up to 135° C. in about 75 minutes and heated at 135° C. to 140° C. for about 3½ hours. Upon cooling, a precipitate separated which redissolved upon addition of xylene in amount so the solution contained 29.9% solids by weight.

Interpolymer B

Interpolymer B, containing about 31% polymerized styrene, was prepared in a glass reactor fitted with a stirrer, reflux condenser and carbon dioxide bubbler. In parts by weight, 421 parts of a 50% solution of polyester B in xylene was heated to 145° C. and then a solution of 3.15 parts of di-tertiary butyl peroxide in 105 parts of freshly distilled styrene was added during 45 minutes while refluxing the reaction mixture at 145° C. The mixture was heated an additional 165 minutes under reflux to complete the interpolymerization and was then diluted to 50% solids with xylene. A few gel-like particles were removed by filtration through Super-cel.

In order to test the properties, solutions of Interpolymers A and B were prepared containing about 38% of the interpolymer. In some cases, metal naphthenate drier was added, the amount of metal being indicated in the table below. Films were prepared by spreading the solutions on glass panels with a 5 mil doctor blade. Drying properties were determined according to the procedures described by Henry A. Gardner in "Physical and Chemical Examination of Paints, Varnishes, Lacquers and Colors," 1939, pages 106-107. The alkali resistance of films two days old was tested by immersion in 3% aqueous sodium hydroxide and observing the length of time for first dulling of the films. Sward Hardness of films was also determined at intervals of time.

For purposes of comparison, parallel tests were run on linseed oil, a styrenated medium oil length alkyd, a styrenated short oil length alkyd, and two styrenated soybean oils.

From the results tabulated below, it is evident that the interpolymer of the invention has markedly superior combination of properties of drying and alkali resistance.

small quantity of xylene as azeotropic agent to remove the formed water of reaction. The mixture was heated up to 250° C. in 130 minutes and held at that temperature for 6 hours and 40 minutes. In this time, the acid number of the solids was reduced to 19.8. The product was diluted with xylene to a concentration of 84.7% solids.

The polyester was interpolymerized with styrene in a glass kettle fitted with a stirrer, dropping funnel, reflux condenser and nitrogen bubbler. A mixture of 354 parts of the solution of polyester (300 parts polyester) and 100 parts of xylene was heated to 145–150° C. A solution of 3 parts of di-tertiary-butyl peroxide in 150 parts of commercial styrene (containing 10–15 p. p. m. of tert-butylcatechol) was added to the polyester solution and maintained at 145–150° C. over a period of 67 minutes. The mixture was then heated at 145–150° C. for an additional 5 hours, after which it was diluted with xylene to 60% solids concentration and filtered with Super-cel. Additional xylene was added to the filtrate so that the solids concentration was reduced to 44.4%. This solution of the interpolymer was used in various tests as a surface-coating material to be described later.

Interpolymer D

Interpolymer D was prepared by interpolymerizing styrene with linseed oil fatty acid ester of Polyether C (of higher molecular weight than Polyether A). The polyester was prepared in apparatus like that described above. A mixture of 1000 parts of Polyether C, 1000 parts of linseed oil fatty acid and a small quantity of xylene as azeotropic agent. The mixture was upheated to 250° C. in 2 hours and held at that temperature for 3 hours and 30 minutes. The reaction mixture was then diluted with xylene to a solids concentration of 48.9%. The acid number, on the basis of solids, was 11.1.

The interpolymerization of the polyester with

|  | Interpolymer A | Interpolymer A | Interpolymer B | Linseed Oil | Styrenated Med. Oil Alkyd (Styresol 4400) | Styrenated Med. Oil Alkyd (Styresol 4400) | Styrenated Short Oil Alkyd (Styresol 4250) | Styrenated Drying Oil Modif. Alkyd (Cycopol) | Styrenated Soybean Oil | Styrenated Soybean Oil |
|---|---|---|---|---|---|---|---|---|---|---|
| Drier | 0.03% Co | None | 0.03% Co | 0.05% Co; 0.50% Pb | 0.03% Co | None | 0.03% Co | 0.03% Co | 0.05% Co | 0.05% Co |
| Drying time in Hr.-Min— 1 mil solvent-free films: |  |  |  |  |  |  |  |  |  |  |
| Set to touch | 0-10 | 0-10 | 0-10 | 1-20 | 0-10 | 0-10 | 0-10 | 0-10 | 0-20 | 0-20 |
| Dried hard | 0-30 | 1-10 | 12-00 | 10 days | 1-30 | 4 days | 0-50 | 2-40 | 22-00 | 22-00 |
| Cotton-free | 0-10 | 0-20 | 0-40 | Not in 50 days | 1-10 | 16-00 | 0-30 | 1-30 | 48-00 | 48-00 |
| Alkali Resistance in 3% aq. NaOH—Films 2 days old: First dulling | 11 hrs | 22 hrs | 24 hrs | 5 min | 14 min | 48 min | 25 min | 5 min | 10 min | 20 min |
| Sward Hardness after— |  |  |  |  |  |  |  |  |  |  |
| 1 week | 30 | 31 |  | 0 | 27 | 8 | 22 | 23 | 6 | 10 |
| 2 weeks | 32 | 38 |  | 0 | 29 | 22 | 33 | 24 |  |  |
| 4 weeks | 39 | 42 |  | 2 (8 wks.) | 31 | 26 | 42 | 29 | 7 | 12 |

The desirable combination of excellent properties is possessed by all of the interpolymers of the invention and is not unique to only a species thereof. This fact will be evident from results obtained upon testing a variety of the interpolymers, preparation of which is described below wherein the parts are by weight.

Interpolymer C

Interpolymer C was an interpolymer of styrene with linseed oil fatty acid polyester of Polyether B (of lower molecular weight than Polyether A). The polyester was prepared in a glass reactor fitted with a phase separating condenser and stirrer by heating a mixture of 360 parts of Polyether B, 788 parts of linseed oil fatty acid and a styrene was effected in like apparatus to that described above. About 818 parts of the polyester solution (400 parts of polyester) was heated to 145° C. in 26 minutes. A solution of 2 parts of di-tertiary-butyl peroxide in 200 parts of commercial styrene containing 10-15 p. p. m. of tertiary-butylcatechol was added to the polyester solution over a period of 1 hour and 15 minutes while maintaining the temperature at about 145° C. The heating at that temperature was then continued for an additional 5 hours. The solution was cooled, diluted with xylene, filtered with the aid of Super-cel, and found to contain 37.6% solids. Additional xylene was added to make a solids concentration of 33.6%. This solution was then tested as surface-coating material.

Interpolymer E

Interpolymer of a soybean oil fatty acid ester and styrene was prepared. The polyester was obtained by heating a mixture of 450 parts of Polyether A, 550 parts of soybean oil fatty acid and about 87 parts of xylene as azeotropic agent to a temperature of 230° C. in 50 minutes and then continuing the heating at that temperature for an additional 7 hours. This reduced the acid number to 9.3 (solids basis). All but about 3 parts of the xylene was removed by sparging with carbon dioxide in the last hour of heating. The reaction product was diluted to 95.3% solids with the aromatic petroleum solvent described hereinbefore for preparation of Polyester A.

A mixture of 220 parts of the polyester solution (210 parts polyester) and 210 parts of xylene was upheated to 141° C. in 50 minutes and a solution of 3.1 parts of di-tertiary-butyl peroxide in 105 parts of styrene was then added during a period of 45 minutes while keeping the temperature at 141–143° C. Heating was continued for an additional 4 hours and 15 minutes at about 145° C. The product was next filtered twice through Super-cel and diluted with xylene to a solids concentration of 48.6% for testing as surface-coating material.

Interpolymer F

Interpolymer of a mixed polyester was prepared. A mixture of 600 parts of polyether A, 586 parts of soybean oil fatty acid, 147 parts of dehydrated castor oil fatty acid, and a small quantity of xylene were heated to 250° C. in 4 hours and held at that temperature for 2 hours and 15 minutes. The reaction mixture was then diluted with additional xylene and filtered with the aid of Super-cel. The filtrate of mixed polyester contained 48.1% solids.

About 624 parts of the solution of mixed polyester (300 parts solids) was heated to 146° C., and a solution of 3 parts of di-tertiary-butyl peroxide in 150 parts of commercial styrene containing 10–15 p. p. m. of tertiary-butylcatechol was added over a period of 66 minutes while maintaining the temperature at 145–146° C. The mixture was then heated an additional 5 hours after which the solution was diluted further with xylene and filtered with the aid of Super-cel. The final solution of interpolymer, containing 40.4% solids, was subjected to testing as surface-coating material.

Interpolymer G

An interpolymer of styrene with a polyester was prepared using a different polymerization catalyst. About 210.5 parts of a xylene solution of Polyester B (117 parts polyester) was heated to 145° C. and maintained at 145–150° C. while a solution of 1.59 parts of cumene hydroperoxide in 52.5 parts of commercial styrene containing 10–15 p. p. m. tertiary-butylcatechol was added during a period of 65 minutes. Heating was continued at 145–150° C. for an additional 4 hours, and then the product was diluted with xylene, filtered with the air of Super-cel and the solids determined. A solution containing 38.3% solids was tested as surface-coating material.

Films of the solutions of Interpolymers C–G were prepared on glass and sheet panels using a doctor blade. The solutions contained 0.03% cobalt as the naphthenate salt. Drying times were conducted as described hereinbefore. Tests were also made on two-day old films for alkali resistance, a bend test and a scratch resistance test. The bend test, which is affected by bending a coated panel 180° over a one-eighth inch mandrel, is indicative of the toughness of the film. If the bend does not fracture the film, it is considered satisfactory (OK). The scratch resistance is performed by drawing a fingernail across the surface of the film so as to obtain a measure of the hardness.

From the tabulated results below, it is evident that the products have excellent drying properties and yield dried films having superior alkali resistance, toughness, scratch resistance, and flexibility.

| Interpolymer | C | D | E | F | G |
|---|---|---|---|---|---|
| Drying time in Hr.-Min.—1 mil solvent-free films: | | | | | |
| Set to touch | 0-10 | 0-10 | 0-10 | 0-10 | 0-10 |
| Dried hard | 5-00 | 6-00 | 3-30 | 5-00 | 12-00 |
| Cotton-free | 1-20 | 0-30 | 0-40 | 1-00 | 0-40 |
| Alkali Resistance in 3% aq. NaOH: | | | | | |
| First dulling | | 24 hrs | 30 hrs | >24 hrs | 24 hrs |
| Bend test, ⅛" mandrel | OK | OK | OK | OK | OK |
| Scratch Resistance, Fingernail | good | excellent | | good | excellent |

We claim as our invention:

1. An interpolymer of a monoaryl-2-alkene-1 containing up to 4 carbon atoms in the alkene group, and an olefinically unsaturated fatty acid polyester of an esterifiable glyceryl polyether of a dihydric phenol having alternating glyceryl radicals and the hydrocarbon radicals of the phenol united in a chain by ether oxygen atoms between said radicals, which acid contains 12 to 22 carbon atoms and has an iodine value of 110 to 400, and which polyester contains at least three acyloxy groups of the fatty acid joined to the glyceryl radicals of the polyether, said interpolymer containing 10% to 75% by weight of polymerized monoarylalkene.

2. An interpolymer as defined in claim 1 wherein the monoaryl-2-alkene-1 is styrene.

3. An interpolymer as defined in claim 1 wherein the monoaryl-2-alkene-1 is styrene and the acid is drying oil fatty acid.

4. An interpolymer of styrene and an olefinically unsaturated fatty acid polyester of an esterifiable glyceryl polyether of 2,2-bis(4-hydroxyphenyl)propane having alternating glyceryl radicals and the hydrocarbon radicals of the phenol united in a chain by ether oxygen atoms between said radicals, which acid contains 12 to 22 carbon atoms and has an iodine value of 110 to 400, and which polyester contains at least three acyloxy groups of the fatty acid joined to the glyceryl radicals of the polyether, said interpolymer containing 25% to 60% by weight of polymerized styrene.

5. An interpolymer as defined in claim 4 wherein the acid is drying oil fatty acid.

6. An interpolymer as defined in claim 4 wherein the acid is linseed oil fatty acid and the polyester contains six to ten acyloxy groups of the fatty acid joined to the glyceryl radicals of the polyether.

7. An interpolymer as defined in claim 4 wherein the acid is soybean oil fatty acid, the polyester contains six to ten acyloxy groups of the fatty acid linked to the glyceryl radicals of the polyether, and the interpolymer contains about one-third by weight of polymerized styrene.

8. An interpolymer as defined in claim 4 wherein the acid is a mixture of about 80% soybean oil fatty acid and about 20% dehydrated castor oil fatty acid, and the polyester contains six to ten acyloxy groups of the fatty acid linked to the glyceryl radicals of the polyether.

ROY W. H. TESS.
  ROBERT H. JAKOB.
  THEODORE F. BRADLEY.

REFERENCES CITED

The following references are of record in the file of this patent:

UNITED STATES PATENTS

| Number | Name | Date |
|---|---|---|
| 2,392,710 | Wakeford et al. | Jan. 8, 1946 |
| 2,456,408 | Greenlee | Dec. 14, 1948 |
| 2,482,086 | Foster | Sept. 20, 1949 |